(12) United States Patent
Watanabe et al.

(10) Patent No.: US 7,660,659 B2
(45) Date of Patent: Feb. 9, 2010

(54) DRIVING SUPPORT APPARATUS (75) Inventors: Kazuya Watanabe, Aichi-ken (JP);
Kazuhiro Kamiya, Aichi-ken (JP);
Yukio Mori, Aichi-pref. (JP)

(73) Assignees: Aisin Seiki Kabushiki Kaisha,
Aichi-ken (JP); Advics Co., Ltd.,
Aichi-pref. (JP)

( * ) Notice: Subject to any disclaimer, the term of this patent is extended or adjusted under 35 U.S.C. 154(b) by 622 days.

(21) Appl. No.: 11/452,928

(22) Filed: Jun. 15, 2006

(65) Prior Publication Data
US 2006/0287800 A1 Dec. 21, 2006

(30) Foreign Application Priority Data
Jun. 17, 2005 (JP) .............................. 2005-177723

(51) Int. Cl.
*B60T 7/12* (2006.01)
*B60T 8/32* (2006.01)
(52) U.S. Cl. ........................... 701/96; 340/435; 348/119
(58) Field of Classification Search ....................... None
See application file for complete search history.

(56) References Cited
U.S. PATENT DOCUMENTS 5,369,590 A * 11/1994 Karasudani ................. 701/300

2004/0257244 A1 * 12/2004 Kubota et al. ............ 340/932.2
2005/0027415 A1 * 2/2005 Iwazaki et al. ................ 701/36
2005/0049766 A1 * 3/2005 Tanaka et al. ................. 701/36
2005/0085984 A1 * 4/2005 Uhler et al. .................... 701/70
2005/0131587 A1 * 6/2005 Takamatsu ..................... 701/1

FOREIGN PATENT DOCUMENTS

| JP | 05-204452 | 8/1993 |
| JP | 2000-136738 A | 5/2000 |
| JP | 2000-229547 | 8/2000 |
| JP | 2001-334899 | 12/2001 |
| JP | 2002-089314 | 3/2002 |
| JP | 2005-075014 | 3/2005 |
| JP | 2006-510541 A | 3/2006 |

* cited by examiner

*Primary Examiner*—Michael J. Zanelli
(74) *Attorney, Agent, or Firm*—Sughrue Mion, PLLC (57) ABSTRACT

A driving support apparatus, which supports a driving operation of a vehicle by an operator by capturing a view around the vehicle and by displaying the captured view on at least a display device provided inside a cabin of the vehicle, and includes: a target spot setting device for setting a target spot that is a position to which the operator attempts to direct the vehicle; a distance measuring device for measuring a distance between the vehicle and the target spot; a speed measuring device for measuring a traveling speed of the vehicle; and a speed controlling device for controlling the traveling speed of the vehicle so as not to exceed a speed predetermined in accordance with the distance between the vehicle and the target spot.

17 Claims, 10 Drawing Sheets

DRIVING SUPPORT APPARATUS

CROSS REFERENCE TO RELATED APPLICATIONS

This application is based on and claims priority under 35 U.S.C. §119 with respect to Japanese Patent Application 2005-177723, filed on Jun. 17, 2005, the entire content of which is incorporated herein by reference.

FIELD OF THE INVENTION

This invention generally relates to a driving support apparatus, which supports a driving operation of a vehicle by an occupant by displaying a view around the vehicle on a displaying means provided inside the vehicle. More particularly, this invention pertains to a driving support apparatus, which is suitable for parking a vehicle.

BACKGROUND

Recently, usage of car navigation systems for vehicles has been widespread. In those recent developments, apparatuses, which offer assistance to occupants of vehicles through use of car navigation systems, have been provided. Not only can the monitors provide geographic information, but also a rear view of the vehicle, and a view of portions that are hidden in blind spots of the vehicle, when the vehicle is about to be parked or being parked. In such apparatuses, the occupant's attention can be captured in order to recognize a view of what is hidden in a blind spot, and an occupant can therefore be warned of a presence of an obstacle, thus enhancing a safe driving operation. Further, if the occupant can have a rear view of the vehicle from a monitor that is normally mounted in front of the occupant, for example attached to an instrument panel, the occupant does not have to twist his body when parking the vehicle backwardly, therefore less driving load is applied to the occupant who is allowed to drive in normal driving posture.

Moreover, various types of driving support apparatuses have been provided, which not only display and provide information, described above, to the occupant, but also attempt to improve a safety level through an active control of driving operations of vehicles, such as an acceleration operation, a steering operation, a brake operation and so on. A parking operation support apparatus disclosed in JP2000-136738A (paragraphs 1-10) is an example of such apparatuses. This apparatus mainly supports a driving operation of an occupant especially when a vehicle is parked or when a vehicle, which has been parked, is started. For example, concerning an acceleration operation, control characteristics of an acceleration control mechanism is modified in such a manner that an upper limit of an opening degree of a throttle valve, or a gain for a valve opening degree, is lowered. As a result, even when an occupant erroneously operates an accelerator pedal excessively at a time of parking or starting, the control mechanism is able to restrain a sudden acceleration or starting of a vehicle.

As described above, by altering control characteristics of an acceleration control mechanism, a sudden starting, which may occur due to an excessive acceleration operation by an occupant, can be restrained. However, if the occupant continues the acceleration operation, a vehicle speed may be raised gradually. Especially when the occupant intends to park the vehicle very close to a wall or gutter, it is preferable to avoid that the vehicle passes by a target stop position. Therefore, in such circumstances, a slow speed driving of a vehicle is required. Meanwhile, a certain level of skills or experiences is required in order to implement a vehicle driving operation while maintaining a slow-speed driving and controlling a distance of the vehicle against the wall or gutter. In the light of the foregoing, it is preferable that driving support apparatuses support a vehicle driving operation of an occupant, especially when such skills or experiences are required. So far, the parking operation support apparatus disclosed in JP2000-136738A can prevent a sudden starting, and yet still requires a fine acceleration operation by an occupant. Moreover, in a case where this sort of vehicle parking is attempted on a slope, hill-climbing ability and/or anti-reverse-movement ability are required. Therefore, while an occupant is required to perform a challenging operation, a driving support by such a driving support apparatus is desired. Further, as described above, if the upper limit of an opening degree of a throttle valve, or a gain for a valve opening degree, is decreased, a torque to be generated is reduced. Therefore, there is a possibility that a vehicle cannot drive up the slope or steps. As described above, considering an application of this apparatus to a vehicle that drives up the slope, further developments are needed to the apparatuses disclosed in JP2000-136738A.

A need thus exists to provide a driving support apparatus, according to which a parking operation can be performed accurately, while a fine driving operation by an occupant can be reduced, regardless of a flatland or a slope on which the vehicle travels.

SUMMARY OF THE INVENTION

According to an aspect of the present invention, a driving support apparatus, which supports a driving operation of a vehicle by an operator by capturing a view around the vehicle and by displaying the captured view on at least a displaying means provided inside a cabin of the vehicle, includes: a target spot setting means for setting a target spot that is a position to which the operator attempts to direct the vehicle; a distance measuring means for measuring a distance between the vehicle and the target spot; a speed measuring means for measuring a traveling speed of the vehicle; and a speed controlling means for controlling the traveling speed of the vehicle so as not to exceed a speed predetermined in accordance with the distance between the vehicle and the target spot.

BRIEF DESCRIPTION OF THE DRAWINGS

The foregoing and additional features and characteristics of the present invention will become more apparent from the following detailed description considered with reference to the accompanying drawings, wherein:

FIG. 18 is an explanatory view for explaining a method of determining a target spot and a set distance, on the basis of an indication by an occupant on the screen of the monitor 2a.

DETAILED DESCRIPTION

An embodiment of the present invention is described herein with reference to FIGS. 1-18.

[System Structure]

Figure 1:
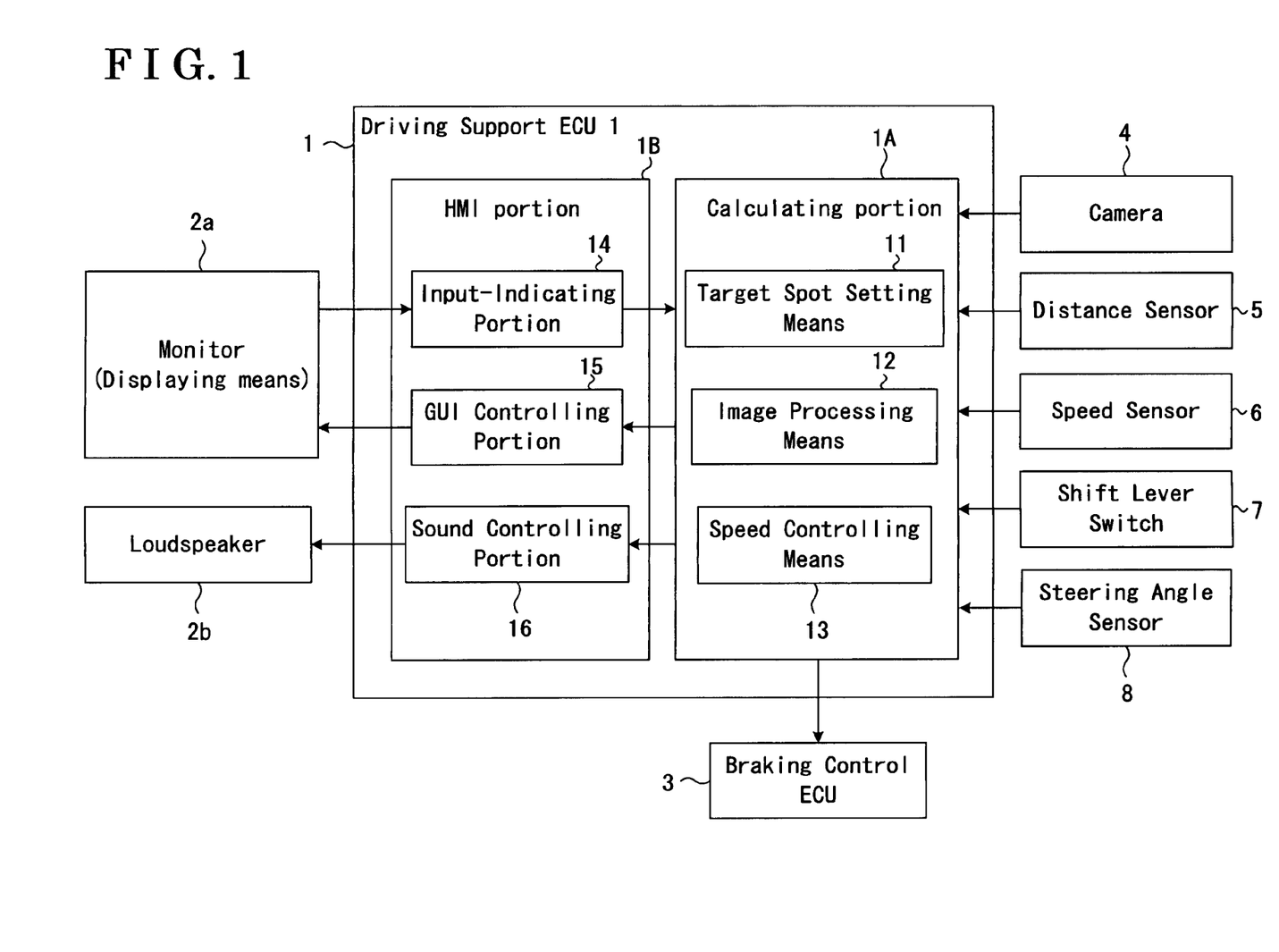
FIG. 1 is a block view schematically illustrating a structure of a driving support apparatus according to an embodiment of the present invention.
Figure 2:
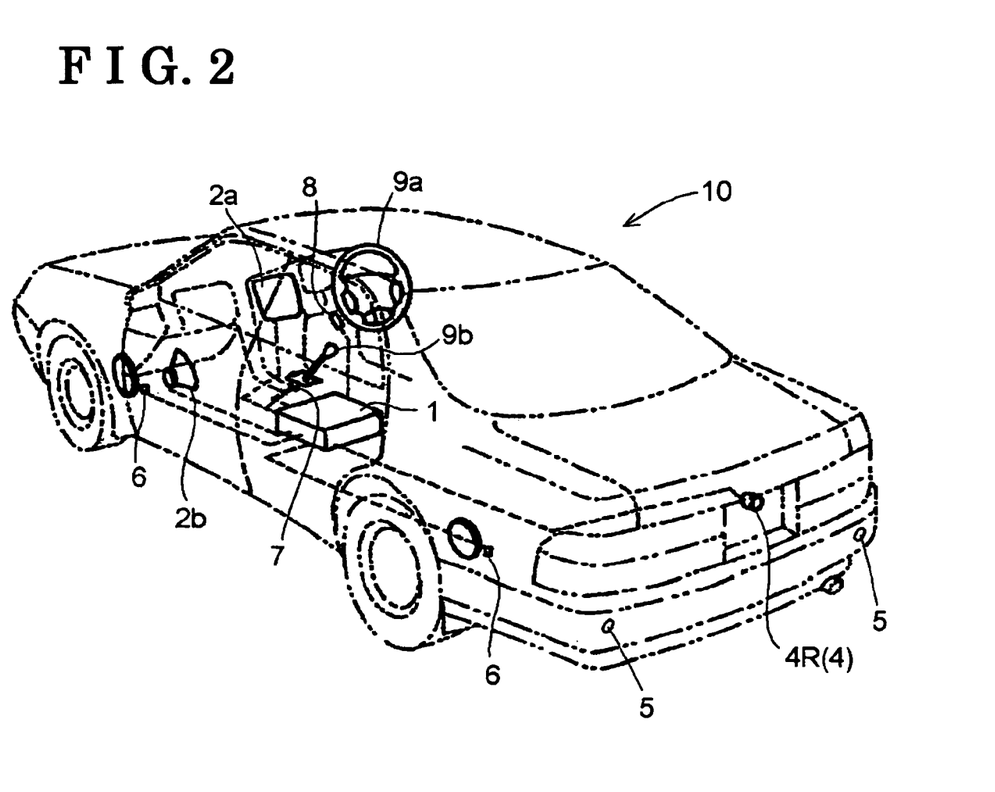
FIG. 2 is a perspective view illustrating an example of a vehicle on which the driving support apparatus illustrated in FIG. 1 is mounted, as viewed from a rearward.

As illustrated in FIGS. 1 and 2, a driving support ECU (Electronic Control Unit) 1 is mainly configured with a microcomputer and a DSP (Digital Signal Processor), and serves as a backbone of the driving support apparatus according to a embodiment of the present invention. The driving support ECU 1 obtains various types of information on a vehicle 10 and a surrounding of the vehicle, from at least one camera 4, a distance sensor 5, at least one speed sensor 6, a shift lever switch 7, a steering angle sensor 8 and so on, and then supports a vehicle driving operation by an occupant (an operator). A monitor (displaying means) 2a and a loudspeaker 2b respectively serve as a warning device, which provides, to an occupant, information transmitted from the driving support ECU 1. As for the monitor 2a, there may be buttons attached thereto, or its display works as a touch screen, which can detect and respond to an action, such as a finger or touch screen pen, pressing on it. That is, the monitor 2a serves not only as the displaying means but also as an inputting means, which is inputted with indications by an occupant. The driving support ECU 1 also transmits the information to a braking control ECU 3. The braking control ECU 3 controls a braking device of the vehicle on the basis of the information and further controls a travel speed of the vehicle 10.

As we see from FIG. 1, the driving support ECU 1 mainly incorporates, therein, an HMI (Human Machine Interface) portion 1B and a calculating portion 1A. The HMI portion 1B includes: an input-indicating portion 14; a GUI (Graphic User Interface) controlling portion 15; and a sound controlling portion 16. The input-indicating portion 14 is inputted with a target spot of the vehicle 10, which an occupant specifies and sets on an image displayed on the monitor 2a via the GUI controlling portion 15. Details will be described below. The GUI controlling portion 15 is transmitted with a calculation result of the calculating portion 1A, and operates to display, on the screen of the monitor 2a, an image of a view representative of the surrounding of the vehicle 10, or an image in which driving support information marked with characters or lines are superimposed on the image of the vehicle surrounding. The GUI controlling portion 15 further operates so as to display the content of a touch screen on the screen of the monitor 2a.

The calculating portion 1A includes: a target spot setting means 11; an image processing means 12; and a speed controlling means 13. The target spot setting means 11, as described later, sets, as a desired destination to which the vehicle 10 is directed or parked, a point, which is specified by an occupant via the touch screen of the monitor 2a and/or the input-indicating portion 14, so that the vehicle 10 is controlled to be directed or parked at the specified spot. The image processing means 12 carries out various image processing on the basis of an image inputted thereto from the camera 4, and/or detecting results of the distance sensor 5, the speed sensor 6 or the like. For example, as for a vehicle mounted with the plural cameras 4, the image processing means 12 combines images captured by the cameras 4 to a state of unity, such as by superimposing. The image processing means 12 also computes an estimated locus or path of the vehicle 10 and/or an imaginary line that corresponds to a vehicle width and extends in a vehicle longitudinal direction. The speed controlling means 13 operates to control a traveling speed of the vehicle 10 at, or less than, a predetermined speed (a speed limit), on the basis of a relationship between the vehicle 10 and the target spot P1. This control result is transmitted to other controlling units of the vehicle 10, for example, to the braking control ECU 3. The braking control ECU 3 controls braking devices on the basis of this control result transmitted from the driving support ECU 1. A traveling speed of the vehicle 10 is hence controlled so as not to exceed the predetermined speed. The above described portions and means of the driving support ECU 1 are each described and distinguishable in terms of functions, and do not have to be provided independently. For example, the above described portions and means can be operated by a software program implemented by the driving support ECU 1.

Figure 3:
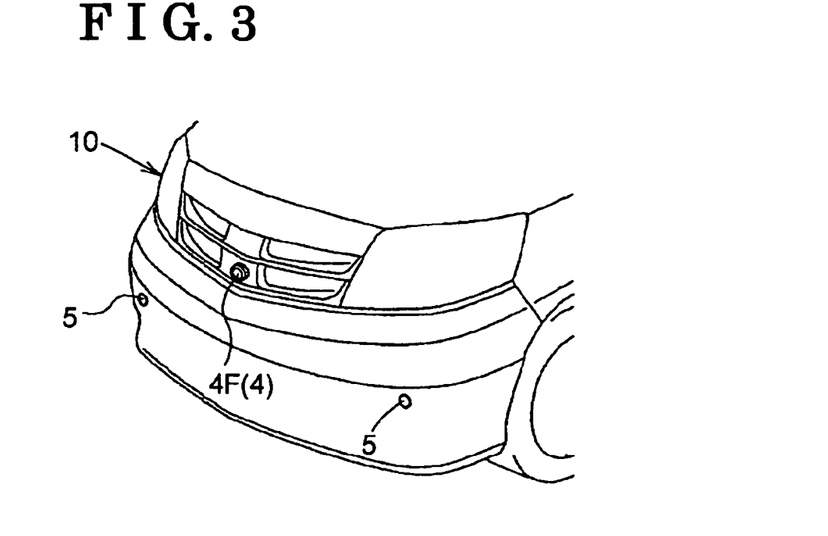
FIG. 3 is another perspective view illustrating an example of a vehicle on which the driving support apparatus illustrated in FIG. 1 is mounted, as viewed from a frontward.

As is illustrated in FIGS. 1, 2 and 3, the vehicle 10 is equipped with a rear camera 4R and a front camera 4F, as the camera 4. However, the embodiment of the present invention can be applied for a vehicle equipped with one of rear and front cameras, or for a vehicle equipped with at least one camera positioned at a left or right side, of a front portion of the vehicle, or at a left or right side, of a rear portion of the vehicle. An image captured by the camera 4 is displayed on the screen of the monitor 2a as a view representative of the surrounding of the vehicle 10. The image processing means 12 calculates a distance (set distance) between the vehicle 10 and the target spot, on the basis of the image picked up by the camera 4. A method of calculating the distance (set distance) is described later. As an alternative method of calculating the distance, the distance sensor 5, such as sonar, laser radar or a combination thereof, can be employed so as to measure a distance of the vehicle 10 relative to an obstacle around the vehicle 10. It is obvious that the distance can be calculated in the calculating portion 1A in combination of an image captured by the camera 4 and the measurement result of the distance sensor 5. That is, a distance measuring means according to the embodiment of the present invention can be accomplished in combination with respective portions and means, such as the camera 4, the image processing means 12, the distance sensor 5, and so on.

The speed sensors 6 are, for example, rotational sensors mounted on respective vehicle wheels. The speed sensors 6 each detect a rotational frequency of each wheel and measure a traveling speed of the vehicle 10. Alternatively, the speed sensors 6 each can detect a rotational frequency of each wheel, and the driving support ECU 1 can calculate a traveling speed of the vehicle 10 on the basis of the detected rotational frequencies. A speed measuring means according to the embodiment of the present invention can be accomplished by the speed sensors 6, or alternatively can be accomplished in combination with the driving support ECU 1 and the speed sensors 6 that is a backbone. The driving support ECU 1 obtains a traveled distance of the vehicle 10 on the basis of the rotational frequencies of the rotational sensors and computes a possible remaining distance between the vehicle 10 and the target spot. The possible remaining distance is substantially equal to a difference between the set distance and the traveled amount.

The steering angle sensor 8 is positioned in the vicinity of a steering wheel 9a. The driving support ECU 1 comprehends a steering state of the vehicle 10, on the basis of the detected result of the steering angle sensor 8. The driving support ECU 1 comprehends, on the basis of an operation state of the shift lever switch 7, whether the vehicle 10 has been at a forward traveling state or at a rearward traveling state, and computes a traveling direction, and a trajectory, of the vehicle 10. That is, the steering angle sensor 8 and the shift lever switch 7 serve as a traveling direction detecting means, respectively. If the speed sensor 6 is structured with a rotational sensor, it is possible to sense, on the basis of a rotational direction of this rotational sensor, a traveling state of the vehicle 10 between a forward traveling state and a rearward traveling state. If rotational speed sensors are mounted on four vehicle wheels, the driving support ECU 1 can compute a steering angle of the vehicle 10, on the basis of differences among four rotational frequencies. In this case, the speed sensors 6 (rotational sensors) and the driving support ECU 1 function as a traveling direction detecting means.

[An Example to Apply the Driving Support Apparatus for a Parking Assistance]

Described below is an example for applying the driving support apparatus according to the embodiment of the present invention to a case in which a vehicle is parked to a parking space or stall while being assisted by the driving support apparatus. As we can see from FIG. 4, the vehicle 10 is backing up straight to access into a parking space E2 of a parking lot having parking spaces E1, E2 and E3. Reference alphabets W denotes borders depicted on the parking lot. According to the embodiment of the present invention, this parking lot does not have any car stopper in place, and a rear end of the parking spaces E1, E2 and E3, which is denoted with a reference alphabet K, is a wall surface. Otherwise, the reference alphabet K, which is a part of the borders W, can be a road shoulder, and a reference alphabet S can denote a gutter or a downside of a cliff. That is, if a rear bumper portion of the vehicle 10 moves in an arrow A1 direction and goes over the reference alphabet K in FIG. 4, the vehicle 10 impacts the wall surface K. Otherwise, if the vehicle 10 moves in the arrow A1 direction and rear wheels of the vehicle 10 passes by the reference alphabet K in FIG. 4, the vehicle 10 may fall down the gutter S or the downside of the cliff S. As is obvious from the above-description, it is preferable for an occupant that a back-in movement of the vehicle 10 is performed in such a manner that a surface, which is vertical to a road surface and comes in contact with a rear end portion of the rear bumper of the vehicle 10, comes adjacent to a reference numeral P1. Here, the occupant is, however, required to operate an accelerator pedal and a brake pedal carefully and finely. The driving support apparatus according to the embodiment of the present invention is hence provided, inter alia, for the purposes of releasing the occupant from such a driving operation which requires caution and fineness and supporting a driving operation appropriately. The reference numeral P1 corresponds to the target spot, as described later.

Figure 4:
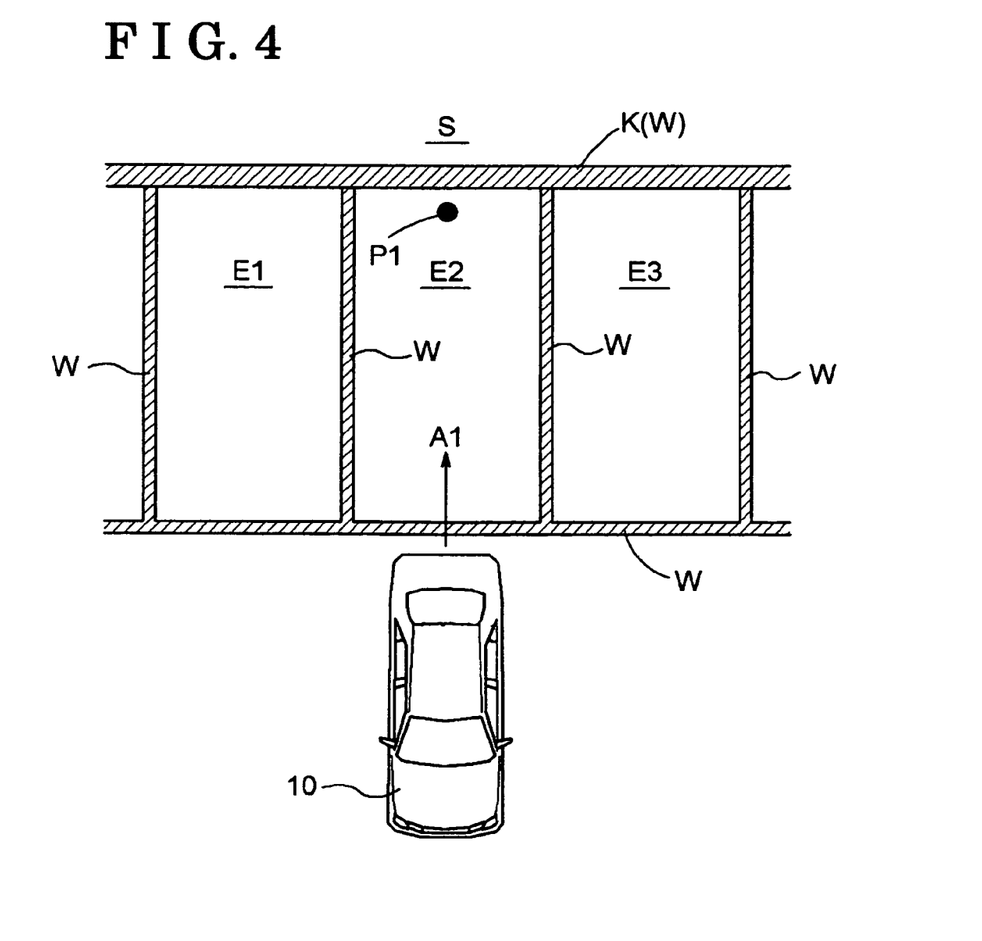
FIG. 4 is an aerial view of a vehicle, on which the driving support apparatus is mounted, and explains an example of a parking assistance for the vehicle.
Figure 5:
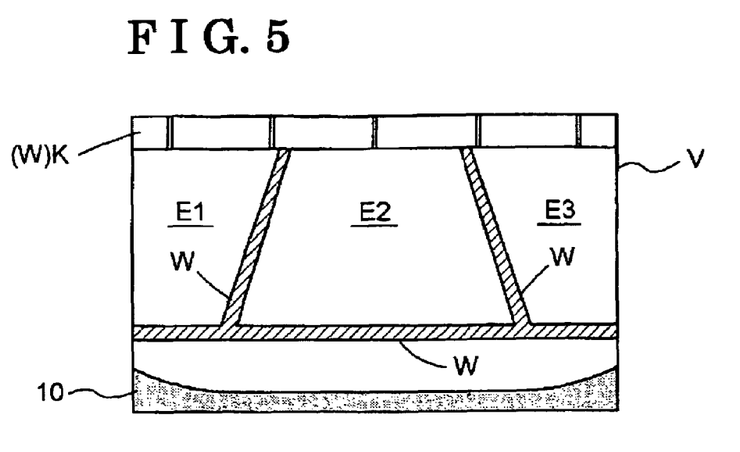
FIG. 5 is an explanatory view for explaining a display area on a screen of a monitor when the vehicle is positioned as illustrated in FIG. 4.

FIG. 5 is an explanatory view for explaining a status of a display area V, which is displayed on the screen of the monitor 2a provided inside a cabin of the vehicle 10 when the vehicle 10 is positioned as illustrated in FIG. 4. FIG. 5 illustrates only a view captured by the rear camera 4R, in order to simplify. As we see from FIG. 5, in the display area V on the screen of the monitor 2a, an entire image of the parking space E2 appears, while the wall surface K appears at the top of the viewing screen V and a portion of the rear bumper of the vehicle 10 appears at the bottom thereof. Next, described below is a procedure of a parking support performed by the parking support apparatus according to the embodiment of the present invention, with reference to FIGS. 6-9.

"MODE_REAR_MON"

Figure 6:
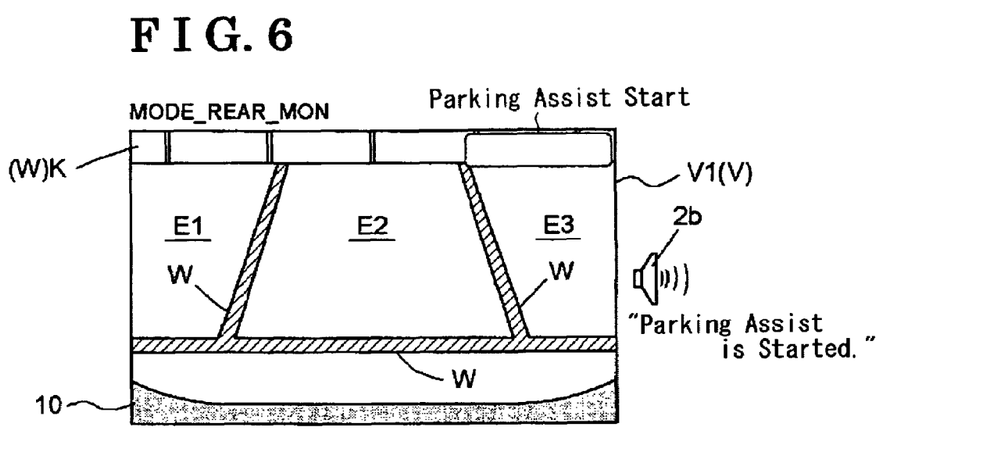
FIG. 6 is an explanatory view for explaining a display area, which is displayed on the monitor and varies in response to a path of the vehicle of which driving is supported.
Figure 7:
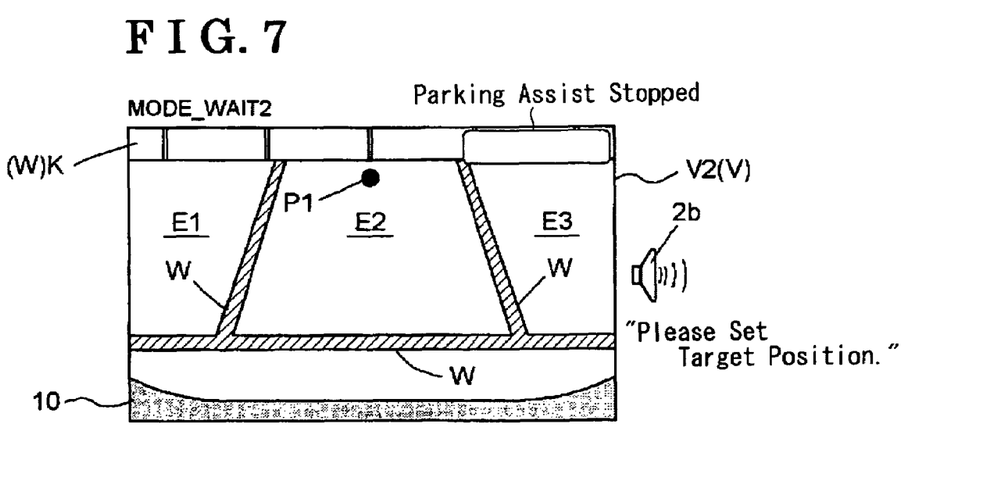
FIG. 7 is another explanatory view for explaining the display area, which is displayed on the monitor and varies in response to the path of the vehicle of which driving is supported.

A display area V1 of FIG. 6 informs an occupant that a driving support is enabled. The driving support ECU 1 shows a program mode "MODE_REAR_MON", as a status of its program, in which parking or backing up of a vehicle can be assisted. In such circumstances, once an occupant touches an indication of "Parking Assist Start" displayed on the touch screen of the monitor 2a, the designated loudspeaker 2b plays a message saying: "Parking assist is started." as an audible indication to the occupant, and a driving support is commenced. That is, once the occupant touches the touch screen of the monitor 2a, a starting switch for a driving support mode (mode_sw) is turned on, and the program mode of the driving support ECU 1 is then shifted.

"MODE_WAIT2"

Once the driving support is commenced as described above, a display area V2 of FIG. 7 indicates, therein, to an occupant "Parking Assist Stopped". This indication represents that the driving of the vehicle 10 has been currently assisted. If the occupant intends to stop the driving assist and touches this indication in the display area V2, the driving assist can be stopped. Here, the designated loudspeaker 2b plays a message saying: "Please set target position.". The occupant then touches, on the touch panel of the monitor 2a, a position corresponding to the reference numeral P1 illustrated in FIG. 4. Accordingly, the target spot is set, which is a destination of the vehicle 10 and is a position to which the rear end portion of the rear bumper of the vehicle 10 should reach. At the same time, a distance (set distance) between the vehicle 10 and the target spot P1 is set (set_up). A message, such as "Sets all completed.", is played when the settings are completed. The driving support ECU 1 shows a program mode "MODE_WAIT2", in which a driving support control is on stand-by. Under this program mode, the driving support ECU 1 sets the target spot P1 and the set distance, and is on stand-by for a moment at which the occupant releases a brake pedal and the vehicle 10 is then starting to move.

"MODE_LOW_SPD"

Figure 8:
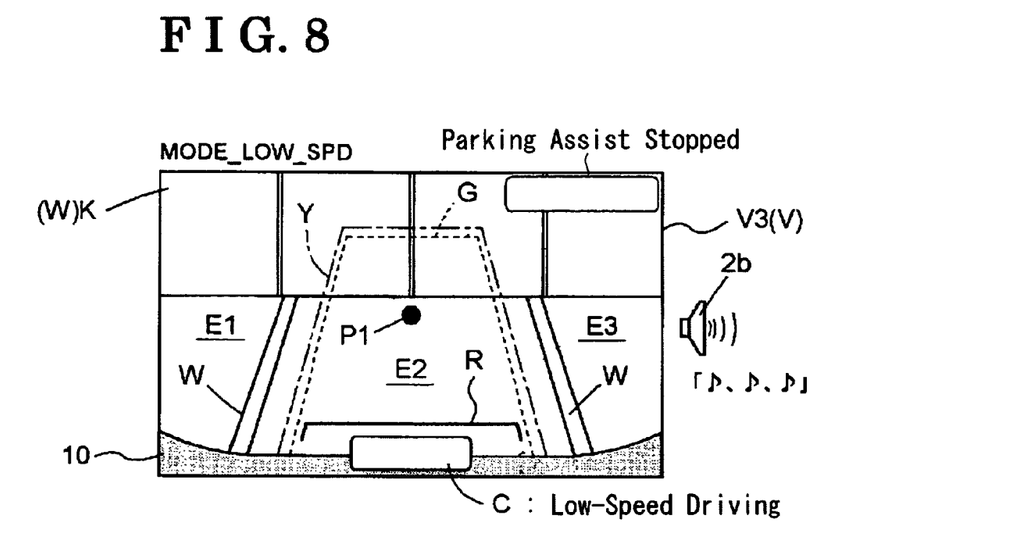
FIG. 8 is still another explanatory view for explaining the display area, which is displayed on the monitor and varies in response to the path of the vehicle of which driving is supported.
Figure 9:
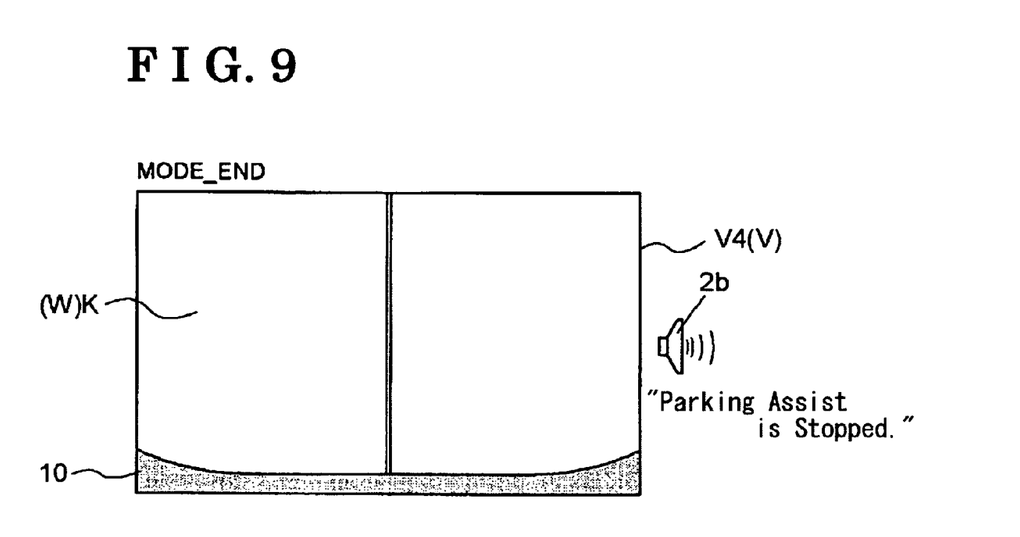
FIG. 9 is still another explanatory view for explaining the display area, which is displayed on the monitor and varies in response to the path of the vehicle of which driving is supported.

FIG. 8 is an explanatory view for explaining a display area V3, which is displayed on the monitor 2a, in a condition where the target spot P1 has been set and the driving assistance has been implemented. Under the program status of "MODE_WAIT2" illustrated in FIG. 7, once the driving support EUC 1 identifies that the target spot P1 has been set (set_up), and the vehicle 10 has started, on the basis of the detected result (speed) of the speed sensor 6 and/or the detected result (braking) of a brake condition detecting means, the program mode of the driving support ECU 1 is shifted to a program mode of "MODE_LOW_SPD". Here, the driving support ECU 1 controls a traveling speed of the vehicle 10 not to exceed the speed limit, and computes various guide lines, so that the designated guide lines are superimposed with the captured image of the camera 4 and are displayed on the screen of the monitor 2a. As we can see from FIG. 8, on a display area V3, a vehicle-width extension G of the vehicle 10, an estimated locus Y of the vehicle 10 and an warning line R are put together with the captured image of the camera 4 so as to all be displayed on the screen of the monitor 2a. A message C, which warns an occupant that the speed limit has been imposed on the vehicle 10, also appears on the screen of the monitor 2a. At the same time, the loudspeaker 2b plays an alarm, which informs the occupant of the speed limit of the vehicle 10.

In the display area V3 of the monitor 2a, in order to enhance visibility of the guiding lines, the warning line R is marked in red, the vehicle-width extension G is marked in green, and the estimated locus Y is marked in yellow. The warning line R is a guiding line representing a position, the distance being approximately 50 cm behind the vehicle 10. For example, when this warning line R overlaps the target spot P1, the vehicle is positioned to a point being approximately 50 cm ahead of the target spot P1. The vehicle-width extension G is an extension of the width of the vehicle 10. In FIG. 8, the vehicle-width extension G appears approximately at the center of the parking space E2, therefore if the vehicle 10 keeps its current posture and moves backward, the vehicle 10 can be fitted into the parking space E2.

The estimated locus Y represents an expected locus or path of the vehicle 10, which is computed by the driving support ECU 1 on the basis of a steering angle, and its appearance varies depending on how left and right edges of the rear portion of the vehicle 10 are swayed. According to the embodiment of the present invention, the estimated locus Y is marked, on the display area V3 of the monitor 2a, so as to approximately overlap the vehicle-width extension G. As we can tell from FIG. 4, according to the embodiment of the present invention, the vehicle 10 can be parked inside the parking space E2 after backing up approximately straightly. Therefore, a steering angle is controlled at zero degrees, and the estimated path is marked straightly along a backward movement direction. As a result, the estimated locus Y is marked, in the screen of the monitor 2a, so as to overlap the vehicle-width extension G.

Figure 10:
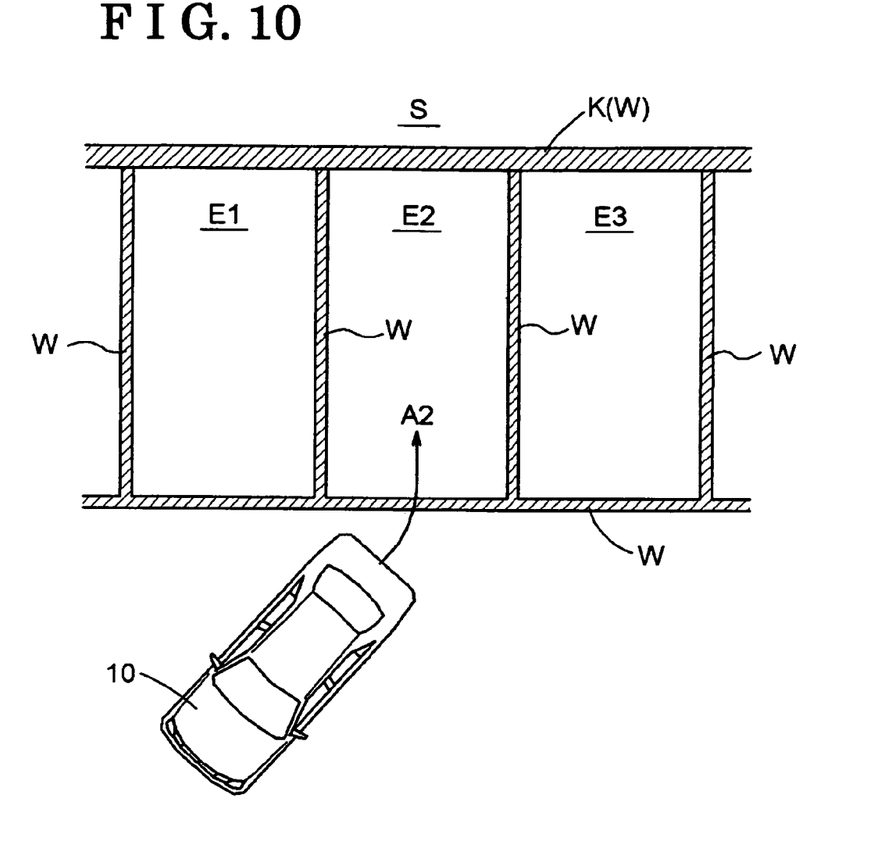
FIG. 10 is an aerial view of the vehicle, on which the driving support apparatus is mounted, and explains another example of the parking assistance for the vehicle.
Figure 11:
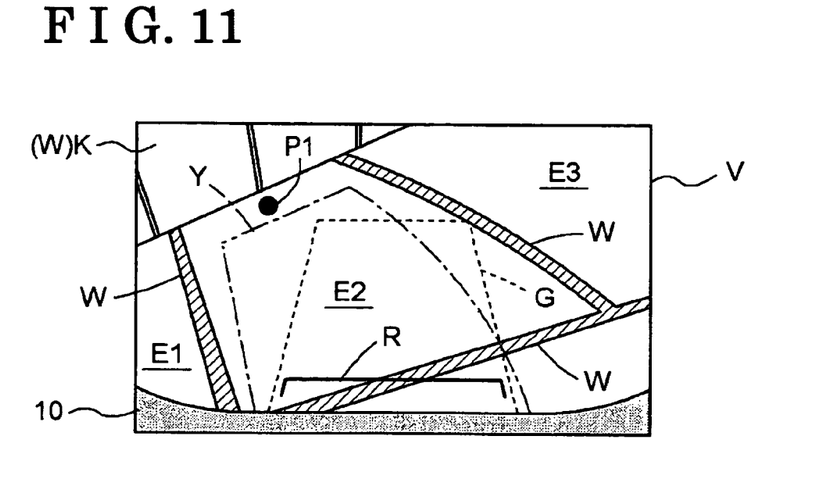
FIG. 11 is an explanatory view for explaining an example of a display area on the screen of the monitor when the vehicle is positioned as illustrated in FIG. 10.

Otherwise, when the vehicle 10 accesses or backs up to the parking space E2 at an angle facing the parking space E2 as illustrated in FIG. 10, the vehicle 10 travels as denoted by an arrow A2. The steering wheel 9a is thus turned in such a manner that the vehicle 10 travels along the arrow A2. Therefore, as is obvious from FIG. 11, the estimated locus Y does not overlap the vehicle-width extension G and is directed towards the target spot P1.

As described above, an occupant is assisted by the monitor 2a with the above-described functions so as to execute a vehicle backing-up operation. That is, the backing-up operation is achieved by operating an accelerator pedal and a brake pedal while operating the steering wheel 9a appropriately. Here, even if the occupant steps on the accelerator pedal excessively, the speed controlling means 13 of the driving support ECU 1 can control the speed of the vehicle 10 at, or less than, a predetermined speed (speed limit) predetermined in accordance with a distance between the vehicle 10 and the target spot P1. That is, without operation of the brake pedal by the occupant, the maximum speed of the vehicle 10 can be ensured at, or less than, the predetermined speed. Therefore, the actual speed of the vehicle 10 can be controlled properly with no occurrence of a time gap that is created by switching an operation between the accelerator pedal and the brake pedal.

Figure 12:
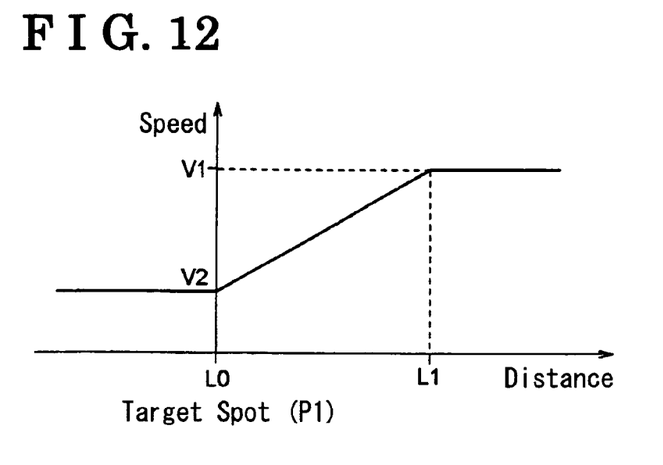
FIG. 12 is a diagram for explaining an example of a relationship between a distance, which is measured between the vehicle and the target spot, and a speed of the vehicle.

This speed limit is determined, for example as is explained in FIG. 12. When a distance between the vehicle 10 and the target spot P1 is at, or greater than, a distance L1 (a first distance), a speed V1 (a first predetermined speed) is employed as the speed limit or as the maximum speed value. While the vehicle 10 is being guided close to the target spot P1, the speed limit is lowered. In other words, the maximum speed value of the traveling speed of the vehicle 10 is controlled by the speed controlling means 13 in response to an approach of the vehicle 10 to the target spot P1. When the vehicle 10 reaches the target spot P1, i.e., when the distance between the vehicle 10 and the target spot P1 becomes zero, a speed V2 (a second predetermined speed) is employed as the speed limit as the maximum speed value. Moreover, if this speed V2 is set at zero, the vehicle 10 can be stopped at the target spot P1. According to the embodiment of the present invention, considering a case in which the target spot P1 does not match a point where an occupant desires to stop the vehicle 10, a speed, which is not zero, is set as the speed V2. Where the vehicle 10 has reached the target spot P1, and a further progress of the vehicle 10 is needed, the speed V2 is set as the limit speed or as the maximum speed value. Particularly speaking, when the occupants expects the vehicle 10 to be stopped, it is on occasions necessary to switch an operation between an accelerator pedal and a brake pedal. At this point, as described above, a speed of the vehicle 10 has been already controlled at a sufficient low level, therefore, even if a time gap is created due to the switching between the accelerator pedal and the brake pedal, the vehicle may move only a little during the time gap. Therefore, an occurrence of the time gap may therefore be ignored.

The speeds V1 and V2 can be determined as needed, but, as an example, the speed V1 can be approximately a speed of 1.5 km/h and the speed V2 can be a speed of 0.5 km/h. The distance L1, at which a gradual decrease in the speed V1 is initiated, is, for example, approximately 1 m from the target spot P1.

Figure 13:
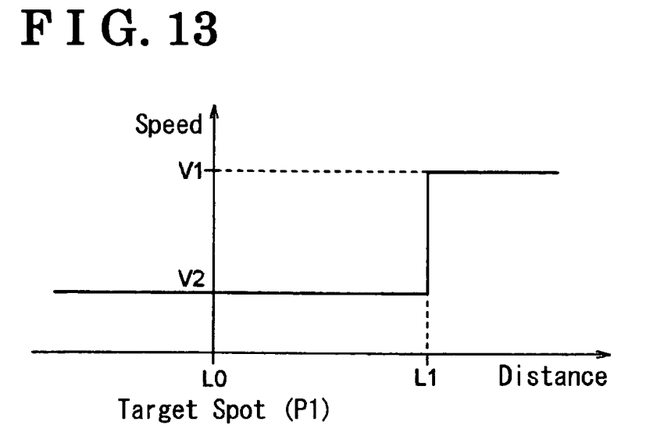
FIG. 13 is a diagram for explaining another example of the relationship between the distance and the speed of the vehicle.
Figure 14:
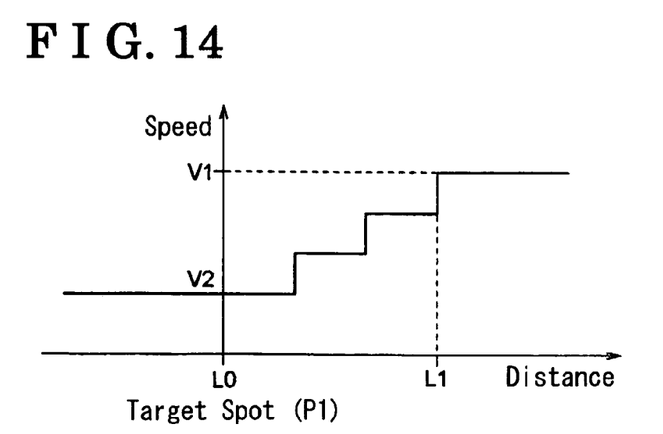
FIG. 14 is a diagram for explaining still another example of the relationship between the distance and the speed of the vehicle.

Speeds, which are respectively determined in accordance with a distance between the vehicle 10 and the target spot P1, are not limited to the characteristics illustrated in FIG. 12 and can be determined based on the characteristics of FIGS. 13 and 14. For example, as is explained in FIG. 13, the speed V1 can be shifted to the speed V2, at the distance L1, like a step response. Otherwise, as is explained in FIG. 14, the speed V1 can be transited to the speed V2 stepwise from the distance L1. As descried above, an actual speed of the vehicle 10, which is controlled, is a remarkably low level, and a difference between the speed V1 and the speed V2 is minimal. Therefore, even if the speed of the vehicle 10 is altered as illustrated in FIGS. 13 and 14, it does not give an occupant a feeling of unpleasantness.

"MODE_END"

Where an occupant determines that the vehicle 10 has traveled sufficiently, the occupant steps on the brake pedal, and the speed of the vehicle 10 is controlled down to zero. The program status of the driving support ECU 1 is hence shifted from "MODE_LOW_SPD" to "MODE_END". Here, because the vehicle 10 has reached the target spot P1, the wall surface K covers an entire display area of the monitor 2a. In a predetermined period of time (e.g., 1 second) after shifting to "MODE_END", the loudspeaker 2b plays a message saying: "Parking Assist Ended", therefore a driving assistance is terminated. Furthermore, if the vehicle 10 starts moving prior to setting the target spot P1 during the program mode of "MODE_WAIT2", the driving support ECU 1 comprehends the vehicle start, on the basis of the detected result (speed) of the speed sensors 6 and/or the detected result (braking) of the brake condition detecting means. In such circumstances as well, the program mode is shifted to "MODE_END".

[Modified Example for Applying the Driving Support Apparatus for a Driving Assistance]

According to the embodiment of the present invention, the target spot P1 is determined on the rear-bumper basis of the vehicle 10, while, when the vehicle 10 moves forward, the target spot P1 can be determined on a front bumper basis thereof. According to a different aspect, when the vehicle 10 is to be lifted up to a central portion of an elevator machine, for example at a multilevel parking garage, it may be on occasions preferable that the target spot P1 is determined on a vehicle wheel portion basis, that is on the basis of a portion of a vehicle which impacts a ground (a rotational center). The basis, which should be referred to for the purpose of determining the target spot P1, can be transmitted to the calculating portion 1A through the HMI portion 1B, and can be selected, for example, on the display area of the screen of the monitor 2a illustrated in FIG. 7.

Further, according to the embodiment of the present invention, the target spot P1 is set on the basis of a position specified by the occupant on the display screen of the monitor 2a. The method of setting the target spot p1, however, is not limited to the above. Where a parking valet (an operator) is standing outside the vehicle 10, or where the vehicle 10 is guided by an indication outside the vehicle 10, the vehicle 10 may be on occasions guided depending on a distance from the current position. In such case, an occupant cannot readily specify the destination on the display area V on the screen of the monitor 2a. In the light of the foregoing, where a traveling distance or a traveling direction is clearly defined, the values representative of these traveling distances/directions can be inputted.

Still further, an image, which appears on the screen of the monitor 2a, can be changed in accordance with a distance between the target spot P1 and the vehicle 10, during the driving assistance. For example, at an early stage of the driving assistance, the screen of the monitor 2a can display, therein, an image captured at a relatively wide-angle. While the vehicle 10 is approaching the target spot P1, an angle of view can be narrowed, and the target spot P1 can be zoomed in. Accordingly, a more accurate driving assistance can be accomplished especially when the vehicle 10 approaches the target spot P1.

[An Example of a Transit of a Program Status of the Driving Support ECU 1]

Described below is a transition of a program status of the driving support ECU 1 with reference to FIGS. 15, 16 and 17. While the vehicle 10 is driving at a normal state, a program status of the driving support ECU 1 is at "MODE_NON" (#0). In this circumstance, when the shift lever switch 7 detects a shift operation to a reverse shift stage or range (shift=R), the program status is shifted to "MODE_REAR_MON" (#12). Here, for example the rear view of the vehicle 10 captured by the camera 4, which is illustrated in FIG. 6, appears on the screen of the monitor 2a. In this circumstance, if the shift lever switch 7 detects a shift operation to a shift stage or range which is different from the reverse shift stage or range, the program status of the driving support ECU 1 returns to "MODE_NON".

During the program status of "MODE_REAR_MON", once the driving support ECU 1 receives an input for initiating a parking assistance (mode_sw=on), as described above with reference to FIG. 6, the program status is shifted to "MODE_WAIT2" (#22). In order to ensure a safety of an occupant more reliably, conditions, according to which the program status is shifted to "MODE WAIT2" from "MODE_REAR_MON", can also include, for example that a brake pedal has been operated (brake=on), and that a speed of the vehicle 10 is approximately zero (speed=0). As described above with reference to FIG. 7, the driving support ECU 1 sets the target spot P1 and is on stand-by until the vehicle 10 starts again. Here, if the driving support ECU 1 receives an input that the parking assistance is stopped, e.g. when an occupant touches the indication on the screen of the monitor 2a, saying: "Parking Assist Stopped", the program status of the driving support ECU 1 returns to "MODE_REAR_MON" again.

During the program of "MODE_WAIT2", if the vehicle 10 starts moving in a condition where the target spot P1 has been set (set_up=completed) and the brake pedal has been released, the program status is shifted to "MODE_LOW-_SPD" (#3). As described above with reference to FIG. 8, the driving support ECU 1 then performs a low-speed driving control. When an occupant determines that the vehicle 10 has reached a sufficient position, the occupant operates the brake pedal (brake=on), and the speed of the vehicle 10 is controlled substantially at zero (speed=0). Here, the program status is shifted to "MODE_END" (#4). The driving support ECU 1 is provided with a timer (not illustrated) which clocks an elapsed time (pass_t) from when the program status is shifted to "MODE_END". If, for example, about 1 second has elapsed (pass_t>sec) after the program status is shifted to "MODE_END", the driving assistance is ended, and the program status of the driving support ECU 1 returns to "MODE-_NON" (#0). Additionally or alternatively, during the program status of "MODE_WAIT2", even when the vehicle 10 starts moving prior to the target spot P1 is set on the screen of the monitor 2a (speed=not zero, brake=off, set_up=not completed), the program status is shifted to "MODE_END" (#4).

Figure 16:
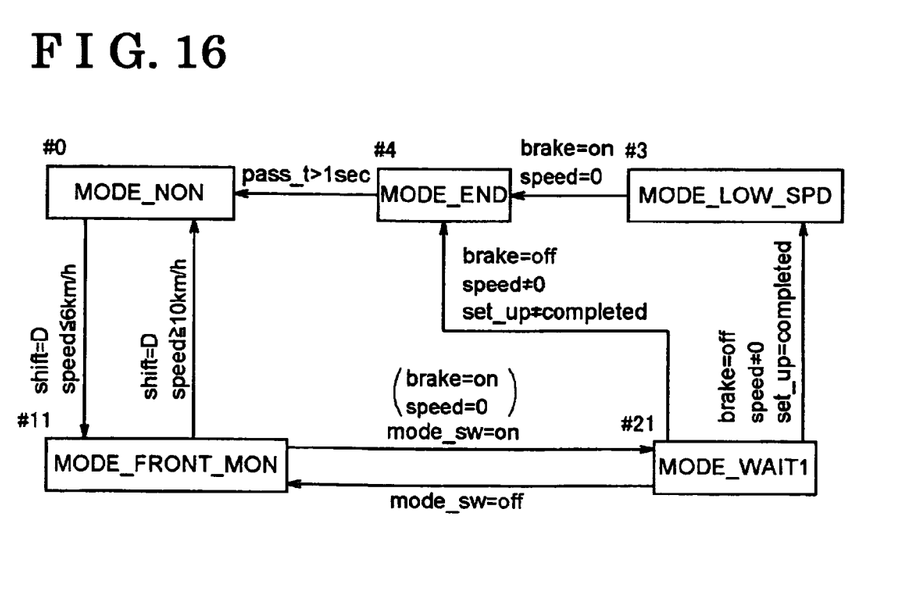
FIG. 16 is a diagram for explaining an example of a transition of a program status during a driving assistance for a forward movement.

FIG. 16 is a diagram for explaining a transition of the program status during the driving assistance for a forward movement of the vehicle 10. A basic transition of the program status of the driving support ECU 1 is substantially the same as the transition of the program status implemented when a vehicle is baking up. Being different from a general forward movement of a vehicle, the vehicle 10 is stopped once and a backward movement thereof is implemented in response to an operation of the shift lever 9b to a reverse shift stage or range. However, when the vehicle 10 is moving forward, such a shift operation of the shift lever 9b does not necessarily take place. Accordingly, a condition, according to which the program status is shifted from "MODE_NON" (#0), includes a speed of the vehicle 10. For example, when the shift lever switch 7 indicates a forward shift stage or range (shift=D), and a speed of the vehicle 10 is at, or less than, 6 km per hour, the program status is shifted to "MODE_FRONT_MON" (#11). Here, the monitor 2a displays a front view of the vehicle 10 captured by the camera 4. Apart from the front view of the vehicle 10, the same display area as the display area V of FIG. 6 appears on the screen of the monitor 2a. Once the speed of the vehicle 10 reaches, for example, 10 km per hour or more, the program status returns to "MODE_NON".

During the program status of "MODE_FRONT_MON", when a parking assistance is specified by the occupant in the same manner as the backing-up operation, the program status is shifted to "MODE_WAIT1" (#21). If the condition, which is the same as the one for the backing-up operation, as described with reference to FIG. 15, is satisfied here, the program status is shifted to "MODE_LOW SPD" (#3). The transition of the program status to each status of "MODE_END" (#4) and "MODE_NON" (#0) can be implemented in the same manner as the backing-up movement, which was described above with reference to FIG. 15. Further, the transition of the program status from "MODE_WAIT1" (#21) to "MODE_END" can be implemented in the same manner as the baking-up movement, which was described above with reference to FIG. 15.

Figure 17:
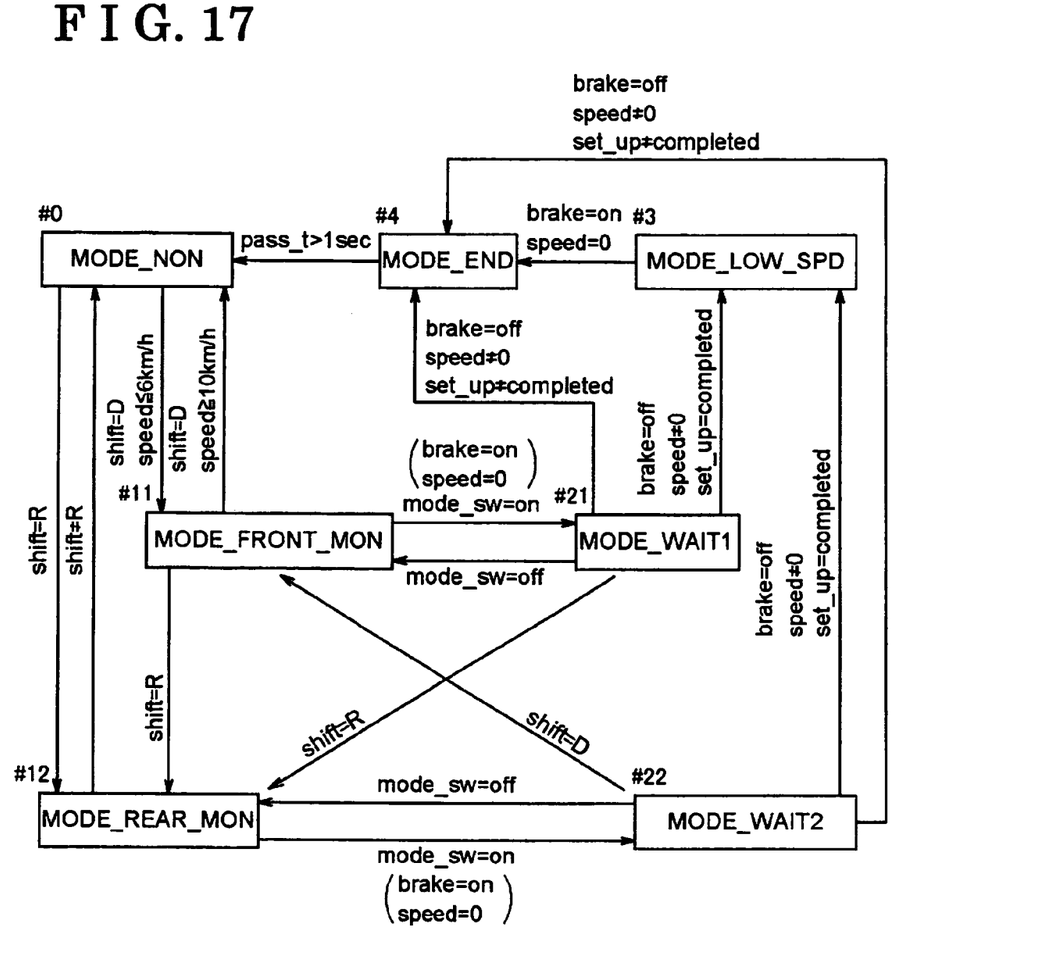
FIG. 17 is a diagram for explaining an example of a transition of a program status during a driving assistance for rearward and forward movements.

FIG. 17 is a diagram for explaining an example of a transition of a program status, in which the transition of the program status for a forward movement is integrated with the transition of a program status for a rearward movement. FIGS. 15 and 16 explain, as above, the transition for each case in order to simplify the description. However, the program of the driving support ECU 1 is generally performed on the basis of the program status transition diagram illustrated in FIG. 17. That is, during a practical vehicle driving control, a forward movement and a reverse movement are changed mutually. For example, even if the current program status is "MODE_FRONT_MON" (#11), once the shift lever 9b is operated to a reverse shift stage or range, the program status is shifted to "MODE_REAR_MON" (#12). Here, once the shift lever 9b is operated to a shift stage or range which is different from the reverse shift stage, the program status returns to "MODE_NON" (#0). If the shift lever 9b is operated to a forward shift stage or range, the program status is shifted to "MODE_FRONT_MON" (#11). Further, even after the program status has been shifted to one of "MODE_WAIT1" (#21) and "MODE_WAIT2" (#22), the program status can be shifted to the other one thereof in response to an operation of the shift lever 9b. Whichever the shift lever 9b is positioned, among a so-called low, top and overtop, the shift lever switch 7 can detect the position of the shift lever 9b as a forward shift stage or range (shift=D).

Figure 15:
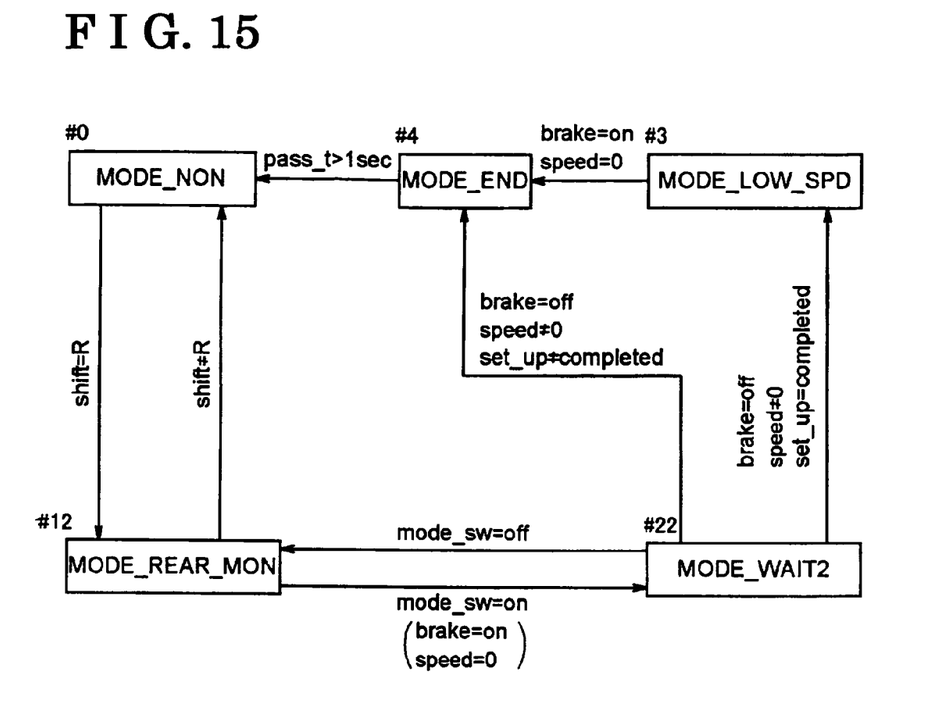
FIG. 15 is a diagram for explaining an example of a transition of a program status during a driving assistance for a rearward movement.

Although it has not been specified or illustrated in FIGS. 15, 16 and 17, where a condition, according to which a driving assistance is not needed, is identified by the driving support ECU 1, the program status is controlled to return to "MODE_NON". This control is implemented, for example when the shift lever switch 7 detects a shift operation to a shift range, which is different from a reverse shift range (shift=R) or a forward shift range (shift=D), such as a parking shift range (shift=P), a neutral shift range (shift=N) and so on.

[Method of Setting a Target Spot and a Set Distance, on the Basis of an Indication by an Occupant on the Screen of the Monitor 2a]

Figure 18:
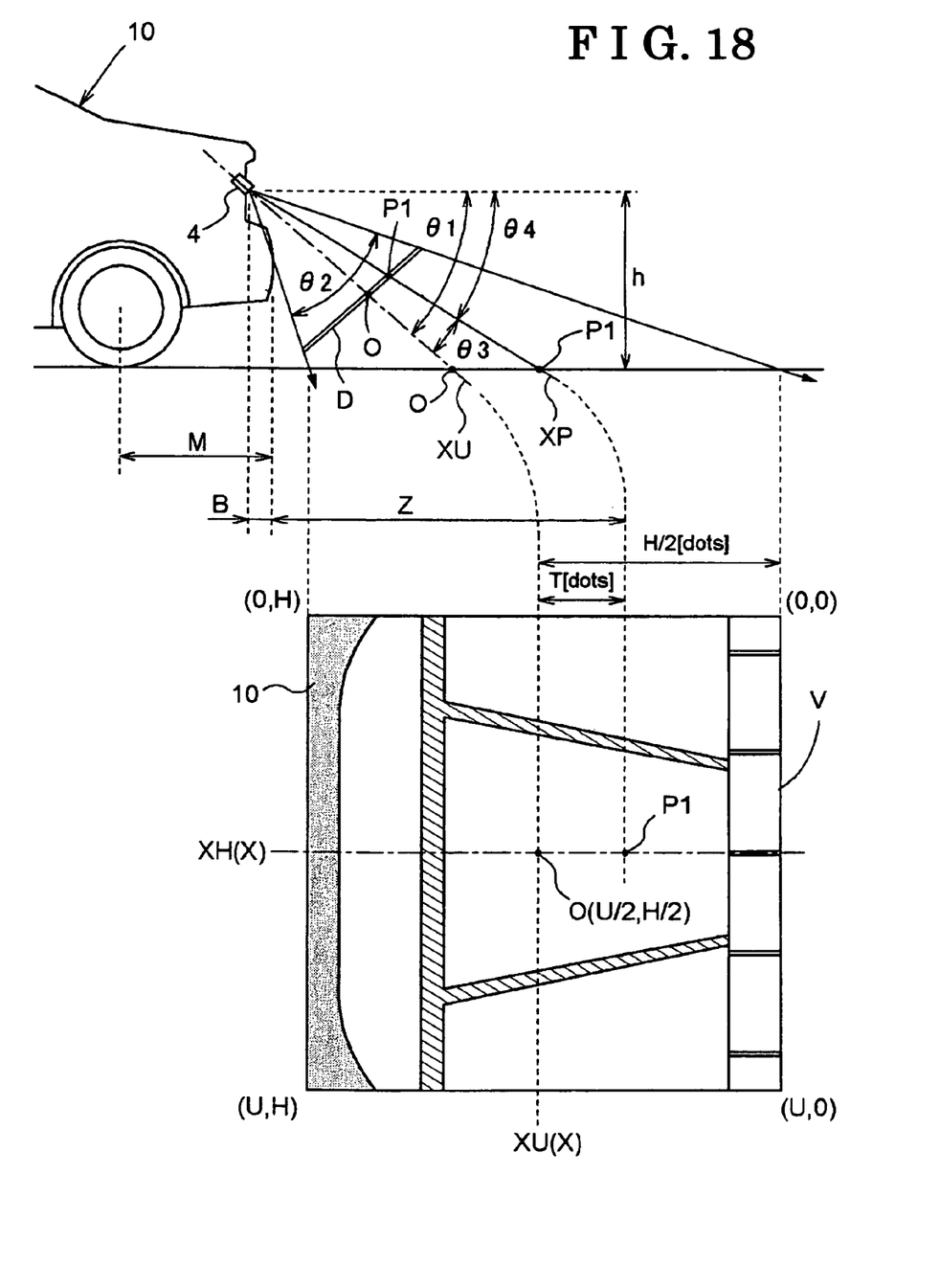

As is apparent from FIG. 18, the camera 4 is located on the vehicle 10 so as to be pointed in a downward direction, in such a manner that the camera 4 can capture a road surface or a picture of a road surface appropriately. A downward angle of the camera 4, which faces in a downward direction from an imaginary surface parallel to a horizontal line, is represented by an angle θ1 which is defined by a horizontal line and a optical axis X (an optical axis XU along the horizontal direction). The camera 4 is located on the vehicle 10 as described above, so that an image, which is captured within a range contained in an angle of view θ2, the angle of view θ2 which is defined along a vertical direction of the camera 4, can appear on the display area V of the monitor 2a. The display area V of the monitor 2a displays an image, which is projected to a double-line D illustrated in FIG. 18. The range, which is contained in the angle of view θ2 along the vertical or perpendicular direction of the camera 4, is denoted by an H-axis of a coordinate which starts from a point "0" and ends at a point "H". On the other hand, a range, which is contained in an angle of view (not illustrated) along a horizontal or width direction of the camera 4, is denoted by a U-axis of the coordinate which starts from a point "0" and ends at a point "U". Therefore, the coordinate of a two-dimensional image, which is displayed on the screen of the monitor 2a, can be denoted with (0,0) to (U,H).

On the display area V of the screen of the monitor 2a, which is illustrated in FIG. 18, a point, at which an optical axis XH along the H-axis intersects with an optical axis XU along the U-axis, is an optical axis X, i.e., the center of an optical axis. In order to simplify the description, here, a point, which represents the target spot P1, is assumed to be specified by an occupant on the optical axis XH along the H-axis. In this case, the target spot P1 is distant from the optical axis 0 by the number of pixels T [dots] on the display area V. Further, a distance from the optical axis 0 to the farthermost point within the angle of view θ2 is a half of the H-axis on the display area V, so that the distance can be represented by the number of pixels H/2 [dots]. Accordingly an angle θ3, which is defined between an optical path XP, which passes through the target spot P1, and the optical axis X(XU), can be obtained according to the following equations:

$$T:H/2=\theta 3:\theta 2/2; \text{ and}$$

$$\theta 3=(T/H)\times \theta 2.$$

A horizontal distance Z, which measures from a bumper portion of the vehicle 10 to the target spot P1, is calculated in accordance with the following equations with parameters h and B, the parameter h which represents a height from a road surface to a location of the camera 4, and the parameter B which represents a horizontal distance from the location of the camera 4 to the bumper portion, and the angle θ3:

$$\tan(\theta 1-\theta 3)=h/(B+Z);$$

$$\tan(90[\deg]-(\theta 1-\theta 3))=(B+Z)/h;$$

$$\theta 4=\theta 1-\theta 3; \text{ and}$$

$$Z=h\times \tan(90[\deg]-\theta 4)-B.$$

As described above, on the basis of the indication or specification by an occupant on the display area V of the monitor 2a, it is possible to calculate the horizontal distance Z, which actually corresponds to the set distance, between the bumper portion of the vehicle 10 and the target spot P1. The horizontal distance B, which measures between the location of the camera 4 and the bumper portion, and the height h at which the camera 4 is located, are inputted into the driving support ECU 1 as values that are given when the camera 4 are located on the vehicle 10. At the same time, the horizontal distance M, which is defined between the bumper portion and an axis of a rear wheel of the vehicle 10, can be also inputted to the driving support ECU 1 as a given value that is included in information of a dimension of the vehicle 10. Therefore, when a stop position is determined for example on the basis of a distance up to a vehicle wheel, the driving support ECU 1 sets the set distance to the target spot P1 at a value which is obtained by adding the distance M to the distance Z. Further, although not being illustrated, horizontal distances, which measure from a front wheel or a front bumper portion, can also be inputted to the driving support ECU 1 as given values in the same manner.

Further, even when an occupant specifies the target spot P1 somewhere, which is not on the optical axis XH, it is possible to calculate a horizontal distance in the same manner. Still further, by applying the same calculating method to the horizontal direction, it is possible to calculate a straight distance that is reflected with a deviation in a left and right direction, which corresponds to the set distance. There are obvious geometrically on the basis of the above description, so that the description will be omitted herein. The driving support ECU 1 can hence implement a driving assistance to guide the vehicle 10 to the target spot P1 obtained described above.

According to the embodiment of the present invention, a speed of a vehicle is controlled so as not to exceed a speed (a speed limit) respectively determined in accordance with a distance between the vehicle and a target spot. Therefore, a time gap does not occur, which is created due to a switching from an operation of an accelerator pedal to an operation of a brake pedal, and a speed of the vehicle can be controlled at a low level. Further, because the speed of the vehicle is controlled as described above, even if an acceleration operation is performed at an amount in order to ride up a slope or steps, the amount which is greater than the one at a time of a normal low-speed driving, the speed of the vehicle can be controlled not to exceed the speed limit, and a torque required can be generated. On the other hand, a vehicle, such as an automatic vehicle, can move in favor of creeping, with no acceleration operation by an operator. Generally speaking, a vehicle speed can achieve to approximately 8to 10 km/H, in favor of a creeping force. However, according to the embodiment of the present invention, even if an operator or an occupant does not perform a braking operation, the traveling speed of the vehicle can be controlled at, or smaller than, a speed limit which is set at a lower speed than 8 to 10 km/h. As a result, regardless of a flatland or a slope, it is possible to supply a driving support apparatus which can reduce a fine driving operation by an occupant (an operator) and can implement a parking operation accurately. Further, when a pedestrian or other vehicle comes into a traveling path of the vehicle, an operation can be warned of the existence thereof through a view displayed on the displaying means. Further, an operator can perform an appropriate care or handling, such as stopping a vehicle by operating a brake pedal.

Further, it is preferable that the target spot setting means sets the target spot based on a position which the operator specifies on an image displayed on the displaying means.

A view representative of a surrounding of the vehicle appears on a display area of the displaying means. Therefore, an operator can specifies, on the display area, a target spot, at which the operator wants to park or direct the vehicle subjectively. That is, it is possible to set a target spot which is set very close to a sense of the operator. If the target spot is different from a position which is desired by the operator, the operator is less satisfied when the driving support apparatus is functioning. However, according to the embodiment of the present invention, a target spot, which is very close to a sense of the operator, so that the operator is more satisfied when the driving support apparatus is functioning.

Still further, it is preferable that the target spot setting means sets the target spot based on a distance, and a direction, from the vehicle, which the operator specifies.

When a parking valet is standing outside the vehicle, or when the vehicle is guided by an indication, the vehicle may on occasions be guided from a current position. In such circumstances, it is not easy for the operator to recognize the distance on the image displayed on the displaying means. In the light of the foregoing, if the target spot setting means sets a target spot on the basis of a direction and a distance, it is possible to set the target spot accurately on the basis of the indication which is given quantitatively. As a result, it is possible to supply the driving support apparatus which can implement a parking assistance accurately.

Still further, it is preferable that the displaying means changes an image to be displayed, in accordance with the distance between the vehicle and the target spot.

The operator drive a vehicle by operating an accelerator pedal, a brake pedal, and a steering wheel, of the vehicle in such a manner that the speed of the vehicle does not exceed a speed limit. Although the target spot is a position which the operators specified on the image displayed on the displaying means, there may on occasions be an error. If this error becomes explicit, any correction can be implemented, such as by stopping the vehicle in front of the target spot in response to the error, by stopping the vehicle after the target spot. Alternatively or in addition, the indication of the target spot can be modified. As described above, if an image, which is displayed on the displaying means, can be changed in response to a distance between the vehicle and the target spot, for example when the vehicle approximates to the target spot, it is possible to zoom in the vicinity of the target spot. In such case, a difference, which is between an operator's expectation about the target spot and an actual indication, becomes explicit, and the above-described correction can be achieved. As a result, it is possible to supply the driving support apparatus which can implement a parking operation accurately.

Still further, it is preferable that the target spot setting means sets the position to which the operator attempts to direct the vehicle, based on at least one of a bumper portion of the vehicle and a wheel portion of the vehicle.

When the operator attempts to park the vehicle very close to the wall surface, it is good if a position, to which the bumper portion of the vehicle reaches, is set as the target spot. However, for example at a multilevel parking garage, when a parking position should be determined by setting a vehicle wheel at an appropriate position, it is necessary to correspond the bumper portion of the vehicle to a position. It is quite difficult for an operator to specify the target spot accurately on the basis of this correspond. In the light of the foregoing, it is preferable if the target spot, which is specified by the operator, is set including a bumper portion basis or a vehicle wheel basis.

As described above, according to the embodiment of the present invention, regardless of a flatland or a slope, it is possible to supply a driving support apparatus which can reduce a fine driving operation by an occupant (an operator) and can implement a parking operation accurately.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A driving support apparatus, which supports a driving operation of a vehicle by an operator by capturing a view around the vehicle and by displaying the captured view on at least a displaying means provided inside a cabin of the vehicle, comprising:
   a target spot setting means for setting a target spot that is a position to which the operator attempts to direct the vehicle;
   a distance measuring means for measuring a distance between the vehicle and the target spot;
   a speed measuring means for measuring a traveling speed of the vehicle; and
   a speed controlling means for controlling the traveling speed of the vehicle so as not to exceed a speed predetermined in accordance with the distance between the vehicle and the target spot;
   wherein operation of an accelerator by the operator during driving support execution does not cause the traveling speed to exceed the predetermined speed.

2. A driving support apparatus according to claim 1, wherein the target spot setting means sets the target spot based on a position which the operator specifies on an image displayed on the displaying means.

3. A driving support apparatus according to claim 2, wherein the displaying means changes an image to be displayed, in accordance with the distance between the vehicle and the target spot.

4. A driving support apparatus according to claim 2, wherein the target spot setting means sets the position to which the operator attempts to direct the vehicle, based on at least one of a bumper portion of the vehicle and a wheel portion of the vehicle.

5. A driving support apparatus according to claim 1, wherein the target spot setting means sets the target spot based on a distance, and a direction, from the vehicle, which the operator specifies.

6. A driving support apparatus according to claim 5, wherein the displaying means changes an image to be displayed, in accordance with the distance between the vehicle and the target spot.

7. A driving support apparatus according to claim 5, wherein the target spot setting means sets the position to which the operator attempts to direct the vehicle, based on at least one of a bumper portion of the vehicle and a wheel portion of the vehicle.

8. A driving support apparatus according to claim 1, wherein the displaying means changes an image to be displayed, in accordance with the distance between the vehicle and the target spot.

9. A driving support apparatus according to claim 1, wherein the target spot setting means sets the position to which the operator attempts to direct the vehicle, based on at least one of a bumper portion of the vehicle and a wheel portion of the vehicle.

10. A driving support apparatus according to claim 1, wherein, when the distance between the vehicle and the target spot is at, or greater than, a first distance, a maximum speed value of the traveling speed of the vehicle is controlled at a first predetermined speed by the speed controlling means.

11. A driving support apparatus according to claim 1, wherein a maximum speed value of the traveling speed of the vehicle is lowered by the speed controlling means in response to an approach of the vehicle to the target spot.

12. A driving support apparatus according to claim 1, wherein, until the vehicle reaches the target spot, the traveling speed of the vehicle is controlled to change stepwise from a first predetermined speed to a second predetermined speed which is lower than the first predetermined speed.

13. A driving support apparatus according to claim 1, wherein the displaying means displays, therein, an indication which informs the operator that the traveling speed of the vehicle has been controlled, while the speed controlling means controls the traveling speed of the vehicle so as not to exceed the predetermined speed.

14. The driving support apparatus according to claim 1, wherein the traveling speed of the vehicle is changeable in response to an operation of the accelerator pedal while the driving support is executed.

15. The driving support apparatus according to claim 1, wherein the speed controlling means controls the traveling speed in a manner where the speed controlling means gradually decreases an upper limit value of the traveling speed as the vehicle approaches to the target spot.

16. A driving support apparatus, which supports a driving operation of a vehicle by an operator by capturing a view around the vehicle and by displaying the captured view on at least a displaying means provided inside a cabin of the vehicle, comprising:
   a target spot setting means for setting a target spot that is a position to which the operator attempts to direct the vehicle;
   a distance measuring means for measuring a distance between the vehicle and the target spot;
   a speed measuring means for measuring a traveling speed of the vehicle; and
   a speed controlling means for controlling the traveling speed of the vehicle so as not to exceed a speed predetermined in accordance with the distance between the vehicle and the target spot;
   wherein, until the vehicle reaches the target spot, the traveling speed of the vehicle is controlled to change stepwise from a first predetermined speed to a second predetermined speed which is lower than the first predetermined speed.

17. A driving support apparatus, which supports a driving operation of a vehicle by an operator by capturing a view around the vehicle and by displaying the captured view on at least a displaying means provided inside a cabin of the vehicle, comprising:
   a target spot setting means for setting a target spot that is a position to which the operator attempts to direct the vehicle;
   a distance measuring means for measuring a distance between the vehicle and the target spot;
   a speed measuring means for measuring a traveling speed of the vehicle; and
   a speed controlling means for controlling the traveling speed of the vehicle so as not to exceed a speed predetermined in accordance with the distance between the vehicle and the target spot;
   wherein the displaying means displays, therein, an indication which informs the operator that the traveling speed of the vehicle has been controlled, while the speed controlling means controls the traveling speed of the vehicle so as not to exceed the predetermined speed.

* * * * *